(12) United States Patent
Li

(10) Patent No.: US 11,583,377 B1
(45) Date of Patent: Feb. 21, 2023

(54) ULTRASONIC BACK SUCTION-INTEGRATED TOOTH CLEANER

(71) Applicant: NANJING SEALAND MEDICAL INSTRUMENT CO., LTD, Nanjing (CN)

(72) Inventor: Xinhua Li, Nanjing (CN)

(73) Assignee: NANJING SEALAND MEDICAL INSTRUMENT CO., LTD, Nanjing (CN)

( * ) Notice: Subject to any disclaimer, the term of this patent is extended or adjusted under 35 U.S.C. 154(b) by 0 days.

(21) Appl. No.: 17/758,230

(22) PCT Filed: Sep. 28, 2020

(86) PCT No.: PCT/CN2020/118394
§ 371 (c)(1),
(2) Date: Jun. 30, 2022

(87) PCT Pub. No.: WO2021/063309
PCT Pub. Date: Apr. 8, 2021

(30) Foreign Application Priority Data

Oct. 1, 2019 (CN) .......................... 201921659562.1

(51) Int. Cl.
*A61C 17/20* (2006.01)
*A61C 17/02* (2006.01)
*A61C 17/028* (2006.01)

(52) U.S. Cl.
CPC ............ *A61C 17/20* (2013.01); *A61C 17/028* (2013.01); *A61C 17/0208* (2013.01)

(58) Field of Classification Search
CPC ....... A61C 17/005; A61C 17/02; A61C 17/16; A61C 17/20; A61C 17/22; A61C 17/0208;
(Continued)

(56) References Cited

U.S. PATENT DOCUMENTS 3,589,363 A * 6/1971 Banko ................. A61F 9/00745
604/27
3,636,947 A * 1/1972 Balamuth .............. A61C 17/20
601/162
(Continued)

FOREIGN PATENT DOCUMENTS

CN 201216651 Y 4/2009
CN 105411711 A 3/2016
(Continued)

*Primary Examiner* — Robert J Scruggs
(74) *Attorney, Agent, or Firm* — Bayramoglu Law Offices LLC

(57) ABSTRACT

An ultrasonic back suction-integrated tooth cleaner includes a tooth cleaner host and a tooth cleaner handle. The tooth cleaner host includes a pipeline structure inside. Head ends of a water supply pipeline and a back suction pipeline both extend out of a housing of the tooth cleaner host and are connected to a tail end of the tooth cleaner handle. In the present invention, a back suction pipeline is added to an existing tooth cleaner host, so that the host is adapted to an integral tooth cleaner handle with a back suction function. A flow rate in the water supply pipeline is regulated by using an electromagnetic valve, so that a requirement for accurately controlling a water output volume is satisfied. The tooth cleaner handle is ingeniously designed with a back suction pipeline inside the existing ultrasonic handle, so that an aerosol is effectively controlled during ultrasonic tooth cleaning.

10 Claims, 4 Drawing Sheets

(58) Field of Classification Search
CPC ........... A61C 17/028; A61C 3/00; A61C 5/40; A61C 1/07; A61C 1/08; A61B 17/32; A46B 9/04; A46B 11/063
See application file for complete search history.

(56) References Cited

U.S. PATENT DOCUMENTS

| | | | |
|---|---|---|---|
| 4,820,152 A * | 4/1989 | Warrin | A61C 3/025 |
| | | | 433/119 |
| 5,775,901 A | 7/1998 | Riso | |
| 7,530,809 B2 * | 5/2009 | Atkin | A61C 17/20 |
| | | | 433/119 |

FOREIGN PATENT DOCUMENTS

| CN | 105559926 A | 5/2016 |
|---|---|---|
| CN | 207012255 U | 2/2018 |
| CN | 207168600 U | 4/2018 |
| CN | 210990854 U | 7/2020 |

* cited by examiner

ULTRASONIC BACK SUCTION-INTEGRATED TOOTH CLEANER

CROSS REFERENCE TO THE RELATED APPLICATIONS

This application is the national phase entry of International Application No. PCT/CN2020/118394, filed on Sep. 28, 2020, which is based upon and claims priority to Chinese Patent Application No. 201921659562.1, filed on Oct. 1, 2019, the entire contents of which are incorporated herein by reference.

TECHNICAL FIELD

The present invention relates to the field of dental instrument technologies, and in particular, to an ultrasonic back suction-integrated tooth cleaner.

BACKGROUND

During ultrasonic tooth cleaning, while cooling a working tip of a tooth cleaner, sprayed cooling water collides with the working tip in an ultrasonic working state, and generates a mist-like aerosol with a range of approximately 80 cm. Since the aerosol is a source of an inhalable contaminant, effective measures need to be taken to inhibit the aerosol.

At present, a common manner is that an assistant of a dentist uses a saliva ejector for absorption near a tooth cleaning area or uses a semi-fixed cover for absorption. Since the working tip of the tooth cleaner moves during tooth cleaning, and cannot be completely followed in the foregoing absorption manner, the foregoing absorption manner has a shortcoming in absorption efficiency.

Upon searching, the Chinese patent document CN105411711A discloses an ultrasonic irrigator, in which three pipelines with switches and water pumps are connected to a same handle, to respectively spray a disinfectant, emit ultrasonic waves, and perform back suction. However, the irrigator stays at a conceptual design level, and the problems of operating habits and sizes and shapes of components in actual use, as well as, the technical problem that the irrigator cannot be directly applied to the field of ultrasonic tooth cleaning, are not anticipated.

SUMMARY

Technical Problem

During ultrasonic tooth cleaning, a back suction function is added to a working end of a tooth cleaner handle, to isobarically and equidistantly absorb an aerosol generated by an ultrasonic transducer in a working needle, to avoid diffusion of the aerosol in an ultrasonic cleaning environment. A back suction pipeline is designed in a limited space of the ultrasonic tooth cleaner handle, and a sufficient negative pressure is maintained while satisfying operating requirements and habits of existing dental appliances.

Technical Solution

Based on professional knowledge in combination with engineering design experience in stomatology and back suction handles, the inventor actively researches and innovates, and after continuous researching, experimenting, and optimizing the design, and repeatedly trialing samples and making improvements, the inventor finally creates and designs the technical solution of the invention that indeed has a practical value.

An ultrasonic back suction-integrated tooth cleaner is provided, including a tooth cleaner host and a tooth cleaner handle.

The tooth cleaner host includes a pipeline structure inside, the pipeline structure includes a water supply pipeline and a back suction pipeline, head ends of the water supply pipeline and the back suction pipeline both extend out of a housing of the tooth cleaner host, to form a connecting pipeline, and a head end of the connecting pipeline is connected to a tail end of the tooth cleaner handle.

The tooth cleaner handle includes an outer shell, a transducer component, and an ultrasonic working tip, the transducer component is disposed inside the outer shell, the ultrasonic working tip is mounted at a head end of the transducer component, and the transducer component and the ultrasonic working tip include a handle water supply pipeline inside.

A handle back suction pipeline is formed between the transducer component and the outer shell, the transducer component includes an ultrasonic transducer, a connecting rod, a transducer connecting member, and an adapter, the connecting rod is connected to the ultrasonic working tip, the transducer connecting member is fixedly connected to a tail end of the ultrasonic transducer, the adapter is fixedly connected to the transducer connecting member, and the ultrasonic transducer and the transducer connecting member are externally wrapped with an integral encapsulation layer.

A tail end of the adapter is provided with a water supply hole, a backwater hole, and a wire hole, the adapter includes a backwater cavity in the middle, the backwater cavity is isolated from the water supply hole and the wire hole, and a back suction channel is formed between the integral encapsulation layer and the outer shell.

The back suction channel is in communication with a head end of the backwater hole through the backwater cavity, a tail end of the backwater hole is connected to the back suction pipeline, a head end of the water supply hole is in communication with the handle water supply pipeline, and a tail end of the water supply hole is connected to the water supply pipeline.

Preferably, the pipeline structure includes a water supply port, a back suction port, an electromagnetic valve, an electric valve, and an electric ball valve, the water supply port is fixedly mounted on the housing of the tooth cleaner host, a head end of the water supply port is connected to a tail end of the electromagnetic valve through a pipeline, a head end of the electromagnetic valve is connected to an inlet of the electric valve through a pipeline, and an outlet of the electric valve is connected to the tooth cleaner handle through a pipeline, to form the water supply pipeline.

The back suction port is fixedly mounted on the housing of the tooth cleaner host, a tail end of the back suction port is connected to a head end of the electric ball valve through a pipeline, and a tail end of the electric ball valve is connected to the tooth cleaner handle through a pipeline, to form the back suction pipeline.

The electromagnetic valve is configured to control opening and closing of the water supply pipeline. The electric valve includes a plurality of valve openings, to regulate a flow rate in the water supply pipeline. The electric ball valve is configured to control opening and closing of the back suction pipeline.

Preferably, the adapter includes a connecting block and a spacer, a tail end of the connecting block is provided with a water supply hole, a backwater hole, and a wire hole, a boss is disposed at a tail end of the spacer, the connecting block is connected to the spacer through the boss, the water supply hole and the wire hole run through the boss and extend to a head end of the spacer, a backwater cavity is formed between the connecting block and the spacer, to isolate the backwater hole from the water supply hole and the wire hole, thereby avoiding water body contamination between the backwater hole and the water supply hole, and a water inlet head is disposed at the head end of the spacer, to isolate the wire hole from the water supply hole.

Preferably, a tail end of the transducer connecting member is provided with a water inlet trough, a water inlet hole is provided inside the water inlet trough, and an end surface of the water inlet head is in contact with a bottom surface of the water inlet trough, to form a cavity in communication with the water supply hole and the water inlet hole, so that the water supply hole is connected to the water supply pipeline.

Preferably, a coupler is plugged to the tail end of the adapter, a seal ring is disposed between the adapter and the coupler, a central pipeline and a bypass pipeline are arranged on the coupler, the central pipeline is in communication with the backwater hole, and the bypass pipeline is in communication with the water supply hole, to facilitate assembly and disassembly between the tooth cleaner handle and the tooth cleaner host, thereby providing beneficial conditions for disinfection and replacement of the tooth cleaner handle.

Preferably, a water inlet connector is disposed inside the water supply hole, a negative-pressure connector is disposed inside the backwater hole, heads ends of the water supply pipeline and the back suction pipeline both extend out of the housing of the tooth cleaner host, the head end of the water supply pipeline is connected to the coupler of the tooth cleaner handle through the water inlet connector, and the head end of the back suction pipeline is connected to the coupler of the tooth cleaner handle through the negative-pressure connector, to further facilitate assembly and disassembly between the tooth cleaner handle and the tooth cleaner host, thereby providing beneficial conditions for disinfection and replacement of the tooth cleaner handle.

Preferably, the electric valve is a straight-stroke electric valve, an electric actuator of the straight-stroke electric valve is a stepper motor, and the stepper motor controls a valve action, so that the valve is at different openings, to further control a flow rate in the water supply pipeline, for providing an appropriate amount of cooling water for the ultrasonic tooth cleaner in different working states.

Preferably, a silicone aggregation and suction sleeve is sleeved on the head end of the outer shell, and a head end of the silicone aggregation back suction sleeve has a bending structure that matches a shape of the ultrasonic working tip. Such disposition is used for improving an effect of sucking back liquid in an oral cavity by the handle.

Preferably, several slots are circumferentially arranged at the tail end of the ultrasonic transducer, and the transducer connecting member includes a clamping claw for clamping the slots, so that the ultrasonic transducer is connected to the transducer connecting member more firmly.

Preferably, a tapered jacket is disposed at the tail end of the outer cell to prevent the water supply pipeline and the back suction pipeline from being clogged because of a transitional bending.

When the ultrasonic back suction-integrated tooth cleaner provided in the present invention is in use, cold water enters the water supply pipeline through the water supply port, and enters the handle water supply pipeline through the coupler, to cool the ultrasonic working tip in use. A backwater port generates a negative pressure under the action of an external air pump, the negative pressure is transferred to a port of the silicone aggregation and suction sleeve through the back suction pipeline, the coupler, and the handle back suction pipeline, to such back liquid in an oral cavity, thereby inhibiting diffusion of a mist-like aerosol.

Beneficial Effect

Compared with the prior art, the present invention has the following substantive features and progresses:

1. In the tooth cleaner handle of the ultrasonic back suction-integrated tooth cleaner, an encapsulation layer is disposed on outer surfaces of the ultrasonic transducer and the transducer connecting member, so that electric elements in the handle form a sealed whole, which improves a waterproof level of a circuit of the handle.

2. In the ultrasonic back suction-integrated tooth cleaner, a space between the transducer component and the outer shell is used as the handle back suction pipeline, so that an internal space of the handle is fully used, which is more ergonomic.

3. In the tooth cleaner handle of the ultrasonic back suction-integrated tooth cleaner, the backwater cavity is provided in the middle of the adapter, to isolate the water supply pipeline completely from the back suction pipeline inside the handle, so that a water body in the water supply pipeline is prevented from being contaminated, thereby improving use safety of the tooth cleaner handle. Disposition of the adapter improves convenience in connecting the tooth cleaner handle to an external water pipe or wire, and facilitates disinfection and replacement of the tooth cleaner handle.

4. In the tooth cleaner host of the ultrasonic back suction-integrated tooth cleaner, the back suction pipeline is disposed, so that the host is adapted to a tooth cleaner handle with a back suction function, thereby reducing a space occupied by the ultrasonic back suction-integrated tooth cleaner, and improving comfort of a use environment.

Figure 1:
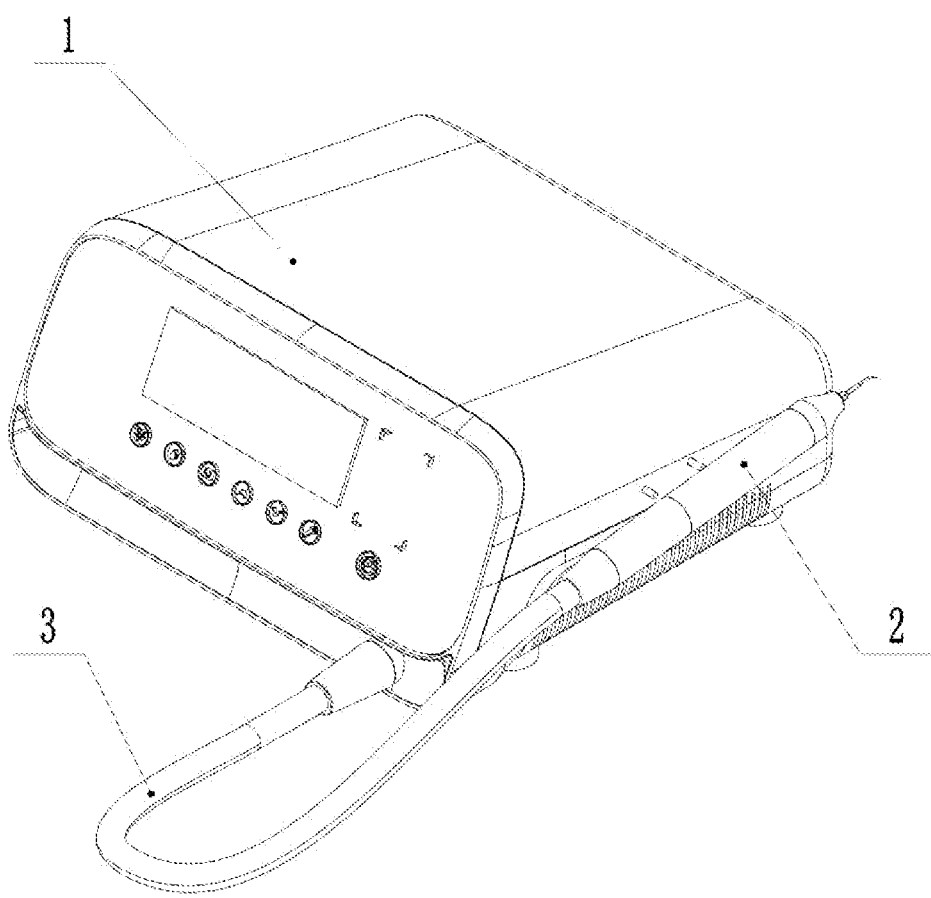
FIG. 1 is a schematic diagram of an ultrasonic back suction-integrated tooth cleaner according to an embodiment of the present invention.

In the figures: tooth cleaner host 1, tooth cleaner handle 2, connecting pipeline 3, water supply port 4, back suction port 5, electromagnetic valve 6, electric valve 7, electric ball valve 8, water supply pipeline 9, back suction pipeline 10, foot pedal port 11, power supply port 12, switch 13, filter 14, outer shell 201, transducer component 202, ultrasonic working tip 203, silicone aggregation and suction sleeve 204, coupler 205, water inlet connector 206, negative-pressure connector 207, filter screen 208, jacket 209, handle back suction pipeline 210, handle water supply pipeline 211, ultrasonic transducer 2021, connecting rod 2022, transducer connecting member 2023, adapter 2024, integral encapsulation layer 2025, water inlet trough 20231, backwater hole 20241, water supply hole 20242, wire hole 20243, connecting block 20244, spacer 20245, boss 20246, backwater cavity 20247, water inlet head 20248.

DETAILED DESCRIPTION OF THE EMBODIMENTS

An ultrasonic back suction-integrated tooth cleaner of the present invention is used for oral cleaning and treatment. A host pipeline structure of the tooth cleaner has a function of accurately controlling an amount of cooling water and a back suction function. An electromagnetic valve and an electric valve are disposed in a water supply pipeline. The electromagnetic valve is used to control opening and closing of the water supply pipeline. Different valve openings of the electric valve are used to regulate a flow rate in the water supply pipeline, for satisfying requirements of the ultrasonic tooth cleaner for an amount of cooling water in different working states. In addition, a back suction pipeline is added to a pipeline structure of a tooth cleaner host, and can be adapted to an integral tooth cleaner handle with a back suction function. In the tooth cleaner handle, a space between an outer shell and a silicone aggregation and suction sleeve is used as a back suction pipeline, so that an effect of sucking liquid in an oral cavity by the tooth cleaner handle is improved while maintaining the original shape and structure of the tooth cleaner handle.

As shown in FIG. 1 to FIG. 6, an ultrasonic back suction-integrated tooth cleaner includes a tooth cleaner host 1 and a tooth cleaner handle 2. The tooth cleaner host 1 includes a pipeline structure inside. The pipeline structure includes a water supply pipeline 9 and a back suction pipeline 10. Head ends of the water supply pipeline 9 and the back suction pipeline 10 both extend out of a housing of the tooth cleaner host 1, to form a connecting pipeline 3. A head end of the connecting pipeline 3 is connected to a tail end of the tooth cleaner handle 2.

The tooth cleaner handle 2 includes an outer shell 201, a transducer component 202, and an ultrasonic working tip 203. The transducer component 202 is disposed inside the outer shell 201. The ultrasonic working tip 203 is mounted at a head end of the transducer component 202. The transducer component 202 and the ultrasonic working tip 203 include a handle water supply pipeline 211 inside.

A handle back suction pipeline 210 is formed between the transducer component 202 and the outer shell 201. The transducer component 202 includes an ultrasonic transducer 2021, a connecting rod 2022, a transducer connecting member 2023, and an adapter 2024. The connecting rod 2022 is connected to the ultrasonic working tip 203. The transducer connecting member 2023 is fixedly connected to a tail end of the ultrasonic transducer 2021. The adapter 2024 is fixedly connected to the transducer connecting member 2023. The ultrasonic transducer 2021 and the transducer connecting member 2023 are externally wrapped with an integral encapsulation layer 2025. The integral encapsulation layer 2025 is formed of liquid silicone in one time, to protect circuits and components therein, thereby improving a dust-proof and waterproof level of the circuits to IP68.

A tail end of the adapter 2024 is provided with a water supply hole 20242, a backwater hole 20241, and a wire hole 20243. The adapter 2024 includes a backwater cavity 20247 in the middle. The backwater cavity 20247 is isolated from the water supply hole 20242 and the wire hole 20243. A back suction channel is formed between the integral encapsulation layer 2025 and the outer shell 201.

The back suction channel is in communication with a head end of the backwater hole 20241 through the backwater cavity 20247. A tail end of the backwater hole 20241 is connected to the back suction pipeline 10. A head end of the water supply hole 20242 is in communication with the handle water supply pipeline 211, and a tail end of the water supply hole 20242 is connected to the water supply pipeline 9.

Figure 2:
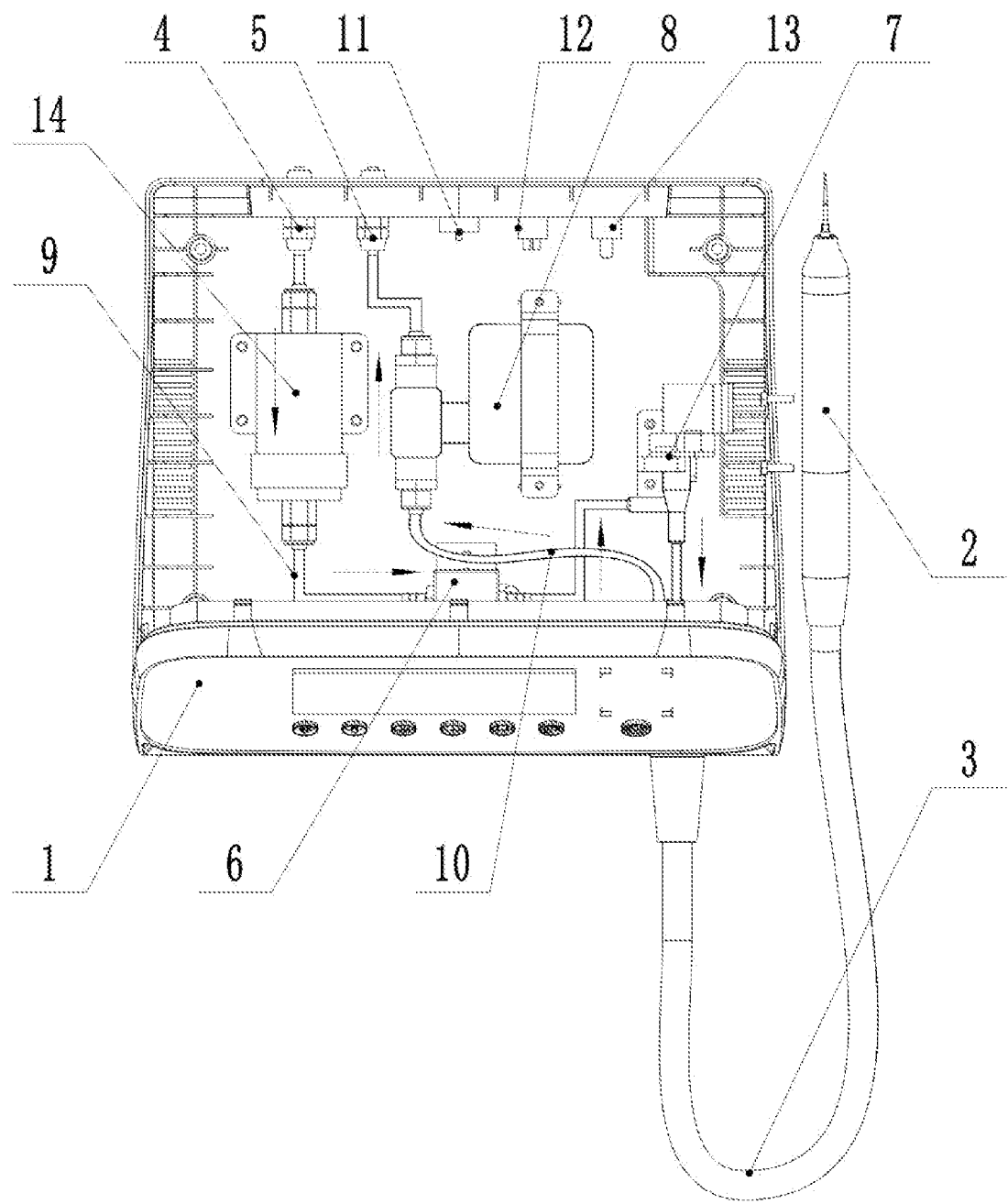
FIG. 2 is a schematic diagram of an internal pipeline structure in FIG. 1.

As shown in FIG. 2, the pipeline structure of the tooth cleaner host 1 is located inside the tooth cleaner host 1. The pipeline structure includes a water supply port 4, a back suction port 5, an electromagnetic valve 6, an electric valve 7, and an electric ball valve 8. The electromagnetic valve 6, the electric valve 7, and the electric ball valve 8 are all fixedly mounted on a housing inside the tooth cleaner host 1. A sheet metal structural member may be selected for a connection to a fastener.

The water supply port 4 is fixedly mounted on the housing of the tooth cleaner host 1. The housing of the tooth cleaner host 1 is provided with a plurality of mounting holes. The water supply port 4 may be disposed through a nut in a mounting hole in an inserted manner. A tail end of the water supply port 4 is connected to a head end of the electromagnetic valve 6 through a pipeline. A tail end of the electromagnetic valve 6 is connected to an inlet of the electric valve 7 through a pipeline. An outlet of the electric valve 7 is connected to the tooth cleaner handle 2 through a pipeline. In this way, the water supply pipeline 9 is formed between the water supply port 4 and the tooth cleaner handle 2.

The back suction port 5 is fixedly mounted on the housing of the tooth cleaner host 1. The back suction port 5 is also disposed through a nut in a mounting hole in an inserted manner. A tail end of the back suction port 5 is connected to a head end of the electric ball valve 8 through a pipeline. A tail end of the electric ball valve 8 is connected to the tooth cleaner handle 2 through a pipeline. In this way, the back suction pipeline 10 is formed between the back suction port 5 and the tooth cleaner handle 2.

The electromagnetic valve 6 is configured to control opening and closing of the water supply pipeline 9. The electric valve 7 includes a plurality of valve openings, to regulate a flow rate in the water supply pipeline 9.

The electric ball valve 8 is configured to control opening and closing of the back suction pipeline 10. CWX-15N may be selected as a model of the electric ball valve, a working temperature of the electric ball valve is less than or equal to 100° C., a rated pressure thereof is 1 Mpa, and a working voltage is DC 12V.

A straight-stroke electric valve may be selected as the electric valve 7. An electric actuator of the straight-stroke electric valve is a stepper motor. The stepper motor controls a valve action, so that the valve is at different openings, to further control a flow rate in the water supply pipeline 9, for providing an appropriate amount of cooling water for the ultrasonic tooth cleaner in different working states. The electric valve 7 is preferably a stepper-motor water-flow regulating valve, and has good control precision and specific waterproof performance.

Tail ends of the water supply pipeline 9 and the back suction pipeline 10 both extend out of the housing of the tooth cleaner host 1. The tail end of the water supply pipeline 9 is connected to the coupler of the tooth cleaner handle 2 through a water inlet connector. The tail end of the back suction pipeline 10 is connected to the coupler of the tooth cleaner handle 2 through a negative-pressure connector. Such disposition facilitates assembly and disassembly between the tooth cleaner handle 2 and the tooth cleaner host 1, thereby providing beneficial conditions for disinfection and replacement of the tooth cleaner handle 2.

As shown in FIG. 1, the water supply pipeline 9 and the back suction pipeline 10 between the tooth cleaner host 1 and the tooth cleaner handle 2 are externally wrapped with a silicone layer, to form a connecting pipeline 3.

Quick-change connectors are disposed at all of a head end and a tail end of the water supply port 4, as well as a head end and a tail end of the back suction port 5, to facilitate connections between the foregoing two and pipelines.

A filter 14 is disposed on the water supply pipeline 9 between the water supply port 4 and an inlet of the electromagnetic valve 6. The filter 14 includes a polypropylene cotton ultrafiltration structure, which filters impurities in a supplied water flow on the one hand, and buffers the water flow on the other hand.

The housing of the tooth cleaner host 1 is further provided with a foot pedal port 11 and a power supply port 12. An end of the foot pedal port 11 is connected to a foot pedal, and the other end thereof is connected to a control circuit of the tooth cleaner host 1. A water output volume of the tooth cleaner host is controlled by using the foot pedal. The power supply port 12 is connected to a power supply, to supply power for the tooth cleaner host 1.

A panel is disposed on the housing of the tooth cleaner host 1. The panel includes a display panel and an operation panel. A plurality of buttons are disposed on the operation panel. The display panel is used to display a working state of the ultrasonic tooth cleaner. The buttons are used to switch a mode, adjust a water output volume, and adjust output power of the tooth cleaner handle.

In use, the tooth cleaner host provided in this embodiment has three modes: a "periodontal" state, a "tooth cleaning" state, and a "root canal washing" state. Different modes may be switched to by using corresponding buttons on the operation panel. Different openings of the electric valve are regulated, so that the pipeline structure of the tooth cleaner host has a 6-level water volume regulation function. The valve opening of the electric valve may be regulated by using the "Increase" and "Decrease" buttons on the operation panel, so that a water volume is regulated.

The mode of the "periodontal" state corresponds to a case of removing calculus near the periodontal tissue; the mode of the "tooth cleaning" state corresponds to a case of removing dental calculus on a surface of a tooth in the oral cavity; and the mode of the "root canal washing" state corresponds to a case of implementing auxiliary washing during root canal treatment.

In the "periodontal" state, a regulation range of the water volume is level 1 to level 3; in the "tooth cleaning" state, a regulation range of the water volume is level 1 to level 6; and in the "root canal washing" state, a regulation range of the water volume is level 1 to level 2. Output power of the tooth cleaner handle corresponds to a level of the water volume. The output power of the tooth cleaner handle is regulated and tested, and can cause resonance of a cooling water flow at different levels, thereby improving an effect of dental cleaning treatment.

For the ultrasonic tooth cleaner using the pipeline structure of the tooth cleaner host, a consumable management system may be further added. An initial quantity of consumables is 100, and each time a consumable is used, the quantity is reduced by 1. When the quantity is less than or equal to 10, the quantity displayed on a screen of the display panel flashes at an interval of 500 ms as a prompt.

As shown in FIG. 3 to FIG. 6, the tooth cleaner handle 2 includes an outer shell 201, a transducer component 202, an ultrasonic working tip 203, and a silicone aggregation and suction sleeve 204. The transducer component 202 is disposed inside the outer shell 201. The silicone aggregation and suction sleeve 204 is connected to a head portion of the outer shell 201. An end of the ultrasonic working tip 203 is connected to the transducer component 202, and the other end thereof extends out of an end portion of the silicone aggregation and suction sleeve 204. The transducer component 202 and the ultrasonic working tip 203 include a handle water supply pipeline 211 inside. A back suction pipeline is formed between the transducer component 202 and the outer shell 201. The silicone aggregation and suction sleeve 204 functions as a drainage tube, and helps to quickly suck water near the ultrasonic working tip 203 back to the back suction pipeline.

The transducer component 202 includes an ultrasonic transducer 2021, a connecting rod 2022, a transducer connecting member 2023, and an adapter 2024. The ultrasonic transducer 2021 is connected to the ultrasonic working tip 203 through the connecting rod 2022. A threaded connection may be selected for the ultrasonic working tip 203 and the connecting rod 2022. The ultrasonic transducer 2021 is fixed to a head end of the transducer connecting member 2023. The adapter 2024 is connected to a tail end of the transducer connecting member 2023. An integral encapsulation layer 2025 is disposed on outer surfaces of the ultrasonic transducer 2021 and the transducer connecting member 2023. The integral encapsulation layer 2025 is formed of liquid silicone in one time, to protect circuits and components therein, thereby improving a dust-proof and waterproof level of the circuits to IP68.

A tail end of the adapter 2024 is provided with a water supply hole 20242, a backwater hole 20241, and a wire hole 20243. The adapter 2024 includes a backwater cavity 20247 in the middle. The backwater cavity 20247 is isolated from the water supply hole 20242 and the wire hole 20243 and connects the backwater hole 20241 and the back suction channel 10. The water supply hole 20242 is connected to the handle water supply pipeline 211. Two independent water-passing pipelines are formed at the adapter 2024, for implementing water supply and back suction functions of the tooth cleaner handle. The wire hole 20243 helps an external wire to enter into the handle, to supply power for and control the ultrasonic transducer 2021. A quantity of the wire holes 20243 is preferably 2.

The adapter 2024 includes a connecting block 20244 and a spacer 20245. A tail end of the connecting block 20244 is provided with a water supply hole 20242, a backwater hole 20241, and a wire hole 20243. A boss 20246 is disposed at a tail end of the spacer 20245. The connecting block 20244 is connected to the spacer 20245 through the boss 20246. The water supply hole 20242 and the wire hole 20243 run through the boss 20246 and extend to a head end of the spacer 20245. A backwater cavity 20247 is formed between the connecting block 20244 and the spacer 20245, to isolate the backwater hole 20241 from the water supply hole 20242 and the wire hole 20243, thereby avoiding water body contamination between the backwater hole 20241 and the water supply hole 20242. A water inlet head 20248 is disposed at the head end of the spacer 20245, to isolate the wire hole 20243 from the water supply hole 20242.

During assembly of the foregoing tooth cleaner handle, a gap between the tail end of the adapter 2024 and the outer shell 201 is sealed, to ensure internal water tightness of the tooth cleaner handle and prevent a water body in the handle back suction pipeline from leaking at the tail end of the adapter 2024. Disposing a seal step at the tail end of the adapter 202 and disposing a seal ring on the seal step may be selected as a sealing manner thereof. Alternatively, a sealant is manually filled into the gap between the tail end of the adapter 2024 and the outer shell 201.

A tail end of the transducer connecting member 2023 is provided with a water inlet trough 20231. A water inlet hole is provided inside the water inlet trough 20231. An end surface of the water inlet head 20248 is in contact with a bottom surface of the water inlet trough 20231, to form a cavity in communication with the water supply hole 20242 and the water inlet hole, thereby facilitating connecting the water supply hole 20242 to the handle water supply pipeline 211. At a joint between the transducer connecting member 2023 and the adapter 2024, the water supply hole 20242 and the handle water supply pipeline 211 form an L-shaped connection, so that after an external water pipe is connected to the tooth cleaner handle, the external water pipe forms a central water supply for the tooth cleaner handle.

The wire hole 20243 extends from the tail end of the adapter 2024 to the transducer connecting member 2023, to help an external wire to supply power for the ultrasonic transducer 2021. A female pin header is disposed inside the wire hole 20243. A head end of the female pin header is connected to a wire terminal of the ultrasonic transducer 2021. The female pin header is disposed to form a push-in connector of the tooth cleaner handle, to facilitate power supply connection and control of the handle.

Figure 4:
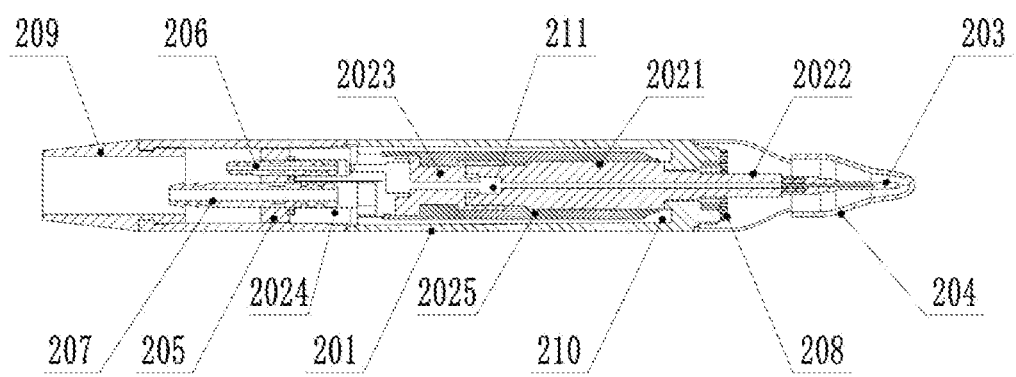
FIG. 4 is a cross-sectional view of FIG. 3.

As shown in FIG. 4, a water inlet connector 206 is disposed inside the water supply hole 20242, to facilitate connection to the water inlet pipe. A negative-pressure connector 207 is disposed inside the backwater hole 20241, to facilitate connection to a water pumping pipe, which is beneficial to a quick connection between the tooth cleaner handle and an external water pipe. The water pumping pipe may be connected to an external air pump, so that the backwater hole 20241 generates a negative pressure when the tooth cleaner handle is used, thereby implementing the back suction function of the tooth cleaner handle.

A coupler 205 is disposed at an upper and of the adapter 2024. A seal ring is disposed between the adapter 2024 and the coupler 205, to produce a better sealing effect for the transducer component 202.

Figure 5:
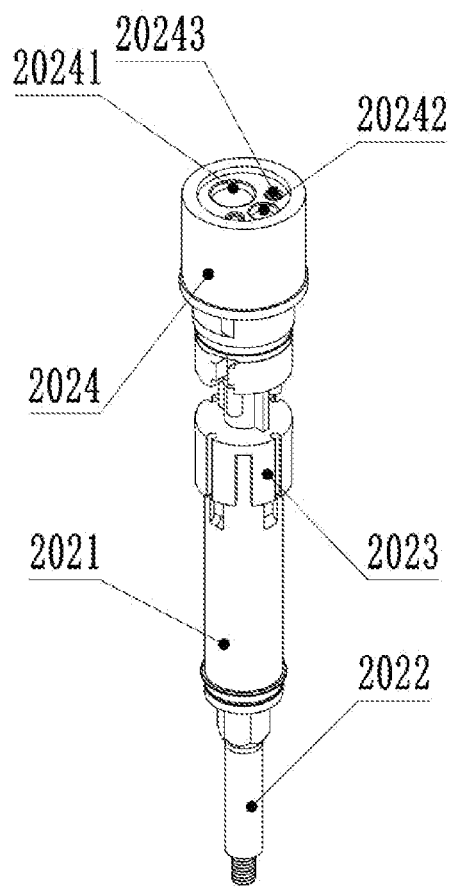
FIG. 5 is a schematic diagram of a transducer component before encapsulation.
Figure 6:
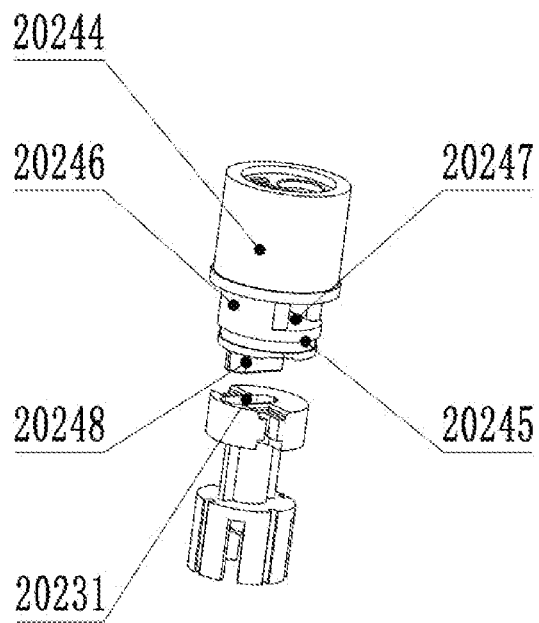
FIG. 6 is a schematic diagram of assembly between a transducer connecting member and an adapter.

As shown in FIG. 5, several slots are circumferentially arranged at the tail end of the ultrasonic transducer 2021. The transducer connecting member 2023 includes a clamping claw for clamping the slots, to make a connection to the transducer connecting member 2023 more firm, thereby preventing the ultrasonic transducer 2021 from loosening and further affecting use because of long-term work of the tooth cleaner handle.

Figure 3:
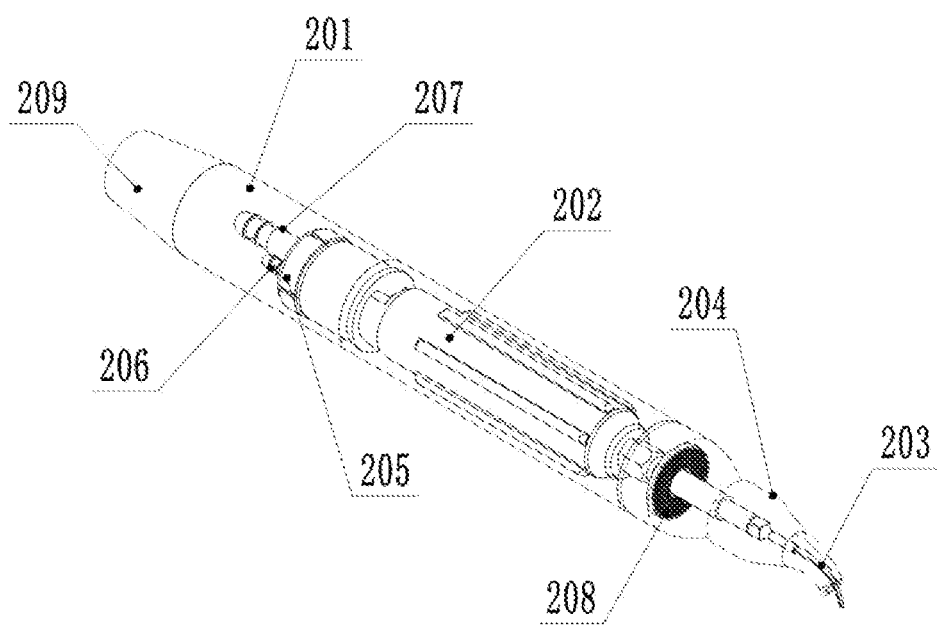
FIG. 3 is a schematic diagram of a tooth cleaner handle 2.

As shown in FIG. 3, the outer shell 201 includes a head portion, a hand-held portion, and a tail portion. Separately mounting is selected for the head portion and the hand-held portion of the outer shell, and the head portion and the hand-held portion are connected through threads, to facilitate disassembly and assembly of the outer shell. A filter screen 208 is disposed on an inner side of the head portion, to prevent foreign matter from clogging the back suction channel. The filter screen 208 is connected to the ultrasonic transducer 2021, and has a specific effect of crushing calculus of a larger particle size. A stainless steel filter screen may be selected as the filter screen 208.

The handle back suction pipeline 10 includes a sucking section, a filtering section, and a recycling section. The sucking section is located at a head end of the outer shell 1, and the filtering section connects the sucking section and the recycling section. The filtering section is located at the head end of the ultrasonic transducer 2021. A filter screen 208 is annularly disposed inside the filtering section, a connecting rod 2222 passes through a center hole of the filter screen 208, and a ring-shaped stainless steel filter screen is used as the filter screen 208.

A silicone aggregation and suction sleeve 204 is sleeved on the head end of the outer shell 201. A head end of the silicone aggregation back suction sleeve 204 has a bending structure that matches a shape of the ultrasonic working tip, for improving an effect of sucking back liquid in an oral cavity by the handle.

A jacket 209 is disposed at a tail portion of the outer shell 201. The jacket 209 is tapered to prevent a water pipe connecting the water supply hole 20242 and the backwater hole 20241 from pipeline clogging caused by a transitional bending.

INDUSTRIAL APPLICABILITY

In the present invention, a back suction pipeline is re-designed in an existing ultrasonic handle structure, and a volume of the handle is controlled. Compared with the existing ultrasonic tooth cleaner handle, the present invention is more ergonomic in terms of operation. The tooth cleaner handle as a whole can withstand a high temperature of 150° C., to facilitate reuse after disinfection. The transducer component forms an integrated handle core in an encapsulation manner, and has higher dust-proof and waterproof performance. In addition, slots are made at the tail portion of the ultrasonic transducer, to improve stability of the connection. The water supply hole at the tail portion of the handle and the water supply pipeline form an L-shaped connection, so that after an external water pipe is connected to the tooth cleaner handle, the external water pipe forms a central water supply for the tooth cleaner handle.

In the present invention, a back suction pipeline is re-designed in the existing tooth cleaner host, and an electric ball valve is disposed in the back suction pipeline, to facilitate controlling opening and closing of the back suction pipeline, so that the host is adapted to an integral tooth cleaner handle with a back suction function. An electromagnetic valve is used to control opening and closing of the water supply pipeline, and control different valve openings of an electric valve, to regulate a flow rate in the water supply pipeline, so that a requirement for accurately controlling a water output volume is satisfied. The electromagnetic valve, in cooperation with the electric valve, can accurately regulate a water volume and a negative pressure of the host in use, thereby improving stability of the ultrasonic tooth cleaner.

The foregoing structural design of the back suction channel ensures that the working end has a sufficient negative pressure capacity, so that an aerosol is effectively inhibited during ultrasonic tooth cleaning, and an outer contour and a volume of the handle are also effectively controlled. The tooth cleaner handle ergonomically inherits an outer contour of the existing ultrasonic tooth cleaner handle well. In addition, an integrated design of an encapsulation layer is used for a transducer component to achieve waterproof of IP68.

What is claimed is:

1. An ultrasonic back suction-integrated tooth cleaner, comprising a tooth cleaner host and a tooth cleaner handle, wherein
the tooth cleaner host comprises a pipeline structure inside, the pipeline structure comprises a water supply pipeline and a back suction pipeline, a head end of the water supply pipeline and a head end of the back suction pipeline extend out of a housing of the tooth cleaner host, to form a connecting pipeline, and a head end of the connecting pipeline is connected to a tail end of the tooth cleaner handle;

the tooth cleaner handle comprises an outer shell, a transducer component, and an ultrasonic working tip, wherein the transducer component is disposed inside the outer shell, the ultrasonic working tip is mounted at a head end of the transducer component, and the transducer component and the ultrasonic working tip comprise a handle water supply pipeline inside;

a handle back suction pipeline is formed between the transducer component and the outer shell; the transducer component comprises an ultrasonic transducer, a connecting rod, a transducer connecting member, and an adapter, wherein the connecting rod is connected to the ultrasonic working tip, the transducer connecting member is fixedly connected to a tail end of the ultrasonic transducer, the adapter is fixedly connected to the transducer connecting member, and the ultrasonic transducer and the transducer connecting member are externally wrapped with an integral encapsulation layer;

a tail end of the adapter is provided with a water supply hole, a backwater hole, and a wire hole; the adapter comprises a backwater cavity in a middle, wherein the backwater cavity is isolated from the water supply hole and the wire hole, and a back suction channel is formed between the integral encapsulation layer and the outer shell; and the back suction channel is in communication with a head end of the backwater hole through the backwater cavity, a tail end of the backwater hole is connected to the back suction pipeline, a head end of the water supply hole is in communication with the handle water supply pipeline, and a tail end of the water supply hole is connected to the water supply pipeline.

2. The ultrasonic back suction-integrated tooth cleaner according to claim 1, wherein the pipeline structure comprises a water supply port, a back suction port, an electromagnetic valve, an electric valve, and an electric ball valve, wherein the water supply port is fixedly mounted on the housing of the tooth cleaner host, a head end of the water supply port is connected to a tail end of the electromagnetic valve through a first pipeline, a head end of the electromagnetic valve is connected to an inlet of the electric valve through a second pipeline, and an outlet of the electric valve is connected to the tooth cleaner handle through a third pipeline, to form the water supply pipeline;

the back suction port is fixedly mounted on the housing of the tooth cleaner host, a tail end of the back suction port is connected to a head end of the electric ball valve through a fourth pipeline, and a tail end of the electric ball valve is connected to the tooth cleaner handle through a fifth pipeline, to form the back suction pipeline;

the electromagnetic valve is configured to control opening and closing of the water supply pipeline;

the electric valve comprises a plurality of valve openings, to regulate a flow rate in the water supply pipeline; and the electric ball valve is configured to control opening and closing of the back suction pipeline.

3. The ultrasonic back suction-integrated tooth cleaner according to claim 2, wherein the electric valve is a straight-stroke electric valve, an electric actuator of the straight-stroke electric valve is a stepper motor, and the stepper motor controls a valve action.

4. The ultrasonic back suction-integrated tooth cleaner according to claim 1, wherein the adapter comprises a connecting block and a spacer, a tail end of the connecting block is provided with the water supply hole, the backwater hole, and the wire hole, wherein a boss is disposed at a tail end of the spacer, the connecting block is connected to the spacer through the boss, the water supply hole and the wire hole run through the boss and extend to a head end of the spacer, the backwater cavity is formed between the connecting block and the spacer, and a water inlet head is disposed at the head end of the spacer.

5. The ultrasonic back suction-integrated tooth cleaner according to claim 4, wherein a tail end of the transducer connecting member is provided with a water inlet trough, a water inlet hole is provided inside the water inlet trough, and an end surface of the water inlet head is in contact with a bottom surface of the water inlet trough, to form a cavity in communication with the water supply hole and the water inlet hole.

6. The ultrasonic back suction-integrated tooth cleaner according to claim 1, wherein a coupler is plugged to the tail end of the adapter, a seal ring is disposed between the adapter and the coupler, a central pipeline and a bypass pipeline are arranged on the coupler, the central pipeline is in communication with the backwater hole, and the bypass pipeline is in communication with the water supply hole.

7. The ultrasonic back suction-integrated tooth cleaner according to claim 6, wherein a water inlet connector is disposed inside the water supply hole, a negative-pressure connector is disposed inside the backwater hole, the head end of the water supply pipeline and the head of the back suction pipeline extend out of the housing of the tooth cleaner host, the head end of the water supply pipeline is connected to the coupler of the tooth cleaner handle through the water inlet connector, and the head end of the back suction pipeline is connected to the coupler of the tooth cleaner handle through the negative-pressure connector.

8. The ultrasonic back suction-integrated tooth cleaner according to claim 1, wherein a silicone aggregation and suction sleeve is sleeved on a head end of the outer shell, and a head end of the silicone aggregation back suction sleeve has a bending structure, wherein the bending structure matches a shape of the ultrasonic working tip.

9. The ultrasonic back suction-integrated tooth cleaner according to claim 1, wherein a plurality of slots are circumferentially arranged at the tail end of the ultrasonic transducer, and the transducer connecting member comprises a clamping claw for clamping the plurality of slots.

10. The ultrasonic back suction-integrated tooth cleaner according to claim 1, wherein the back suction pipeline comprises a sucking section, a filtering section, and a recycling section wherein the sucking section, the filtering section, and the recycling section are connected in sequence, the sucking section is located at the head end of the outer shell, a pipe diameter sequentially increases from the sucking section to the filtering section, a filter screen is disposed inside the filtering section, the filter screen is in a ring shape, an inner ring of the filter screen is sleeved on the connecting rod, and an outer ring of the filter screen is abutted against an inner wall of the outer shell.

* * * * *